Feb. 26, 1929.

J. R. QUAIN

ELECTRODE HOLDER FOR ARC LAMPS

Filed Aug. 26, 1927

Patented Feb. 26, 1929.

1,703,595

UNITED STATES PATENT OFFICE.

JOHN ROBERT QUAIN, OF LONDON, ENGLAND.

ELECTRODE HOLDER FOR ARC LAMPS.

Application filed August 26, 1927, Serial No. 215,719, and in Great Britain January 25, 1926.

This invention has reference to means for holding, supporting and adjusting the electrodes of an arc lamp, and has for its object to produce a simple and effective means whereby the carbons can be easily, expeditiously and accurately adjusted with perfect safety, this application being a continuation in part of application Serial No. 161,627, filed January 17, 1927.

According to this invention the holder or part in which the electrode is inserted is made in the form of a tube screw threaded externally a portion of its length to screw into a collar, forming the electrical connection, fixed in the end of a supporting part made of ebonite or other non-conducting material.

This supporting part is formed tubular so as to fit loosely over the holder, and is provided at the rear end with a flange for securing the device in position, and an opening in the part where the collar is fixed to permit the electrical lead to be connected to said collar, said lead being enclosed by a cap or cover, made of non-conducting material, which screws into said opening. Fitting loosely on the outer end of the supporting part is a sleeve provided with a knob or thumb piece, also made of non-conducting material, which sleeve is locked or fixed to the extreme outer end of the holder by a pin or equivalent. A lock nut is provided on the opposite end of the holder which fixes the electrode in position and permits said electrode to be adjusted or moved in the holder as the electrode is consumed.

The invention is illustrated on the accompanying drawing.

A represents the holder or part in which the carbon B is inserted, $a'$ the lock nut that secures the carbon in its holder, $a^2$ the threaded portion of the holder which screws into the collar $d'$ fixed in the end of the support D, $d^3$ the flange or equivalent by which the device is secured in position, $d^2$ the cap or cover which encloses the lead that is connected to the collar $d'$, $d^4$ the tubular part of the support that fits loosely over the holder A, E, the sleeve which fits loosely on the outer end of the support D, $e'$ the knob or handle provided on the end of the sleeve D by which the holder A is manipulated, and $e^2$ the pin which fixes the said sleeve E to the holder A.

Figure 1:
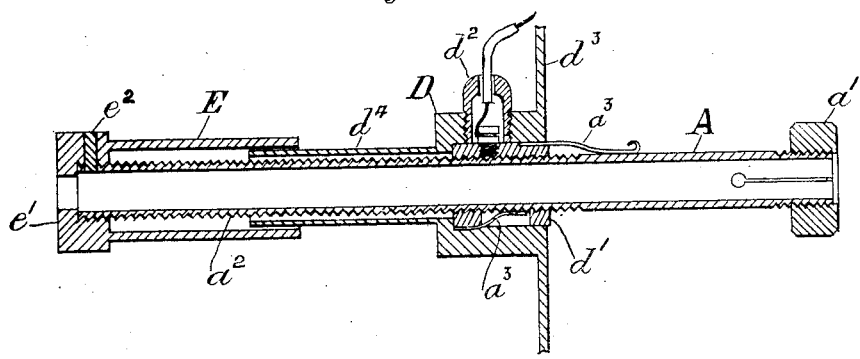
Fig. 1 is a longitudinal sectional view of a carbon holder and support constructed according to this invention.
Figure 2:
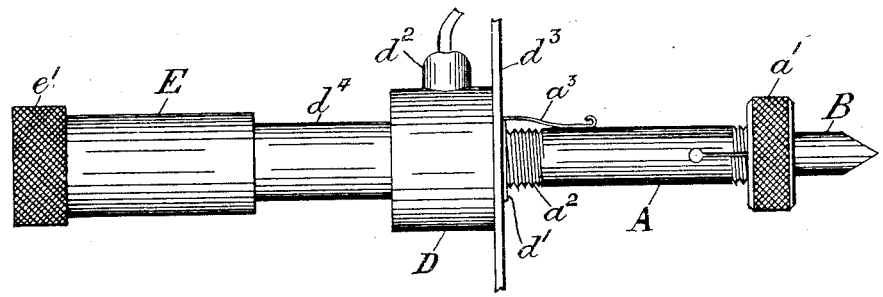
Fig. 2 is a view of the holder and support showing an electrode fixed therein.

It will be seen, on reference to Fig. 1, when the knob $e'$ is operated that the holder A moves further in or out of the support D, thereby enabling the electrode B to be moved into proper relationship with the other electrode necessary to form the arc, which other electrode may be held and supported in a holder correspondingly constructed. Further, as the protruding end of the electrode is consumed it will be seen by slackening the nut $a'$ that the electrode can be pushed forward in the holder A and then locked in position, thereby enabling practically the whole of the electrode to be used.

The contact springs $a^3$ are provided to ensure perfect contact between the holder A and the collar $d'$.

What I claim and desire to secure by Letters Patent is:—

1. An electrode holder comprising a support, an electrode holding tube extending through and screw-threaded within said support, and a knob on one end portion of said tube and having a sleeve telescoping over a portion of said support and insulated therefrom.

2. An electrode holder comprising a support having a tubular flange at one end, a collar fitted within said support at its opposite end, an electrode holding tube extending through said support and screw-threaded within said collar, and a knob on said tube having a sleeve in telescoping relation with said flange and insulated therefrom.

In testimony whereof I have signed my name to this specification.

JOHN ROBERT QUAIN.